US007230350B2

(12) United States Patent
Sallam et al.

(10) Patent No.: US 7,230,350 B2
(45) Date of Patent: Jun. 12, 2007

(54) CIRCUIT ARCHITECTURE FOR VEHICLE HEADLAMP SWITCH

(75) Inventors: Faisal K. Sallam, Dearborn, MI (US); Darrell G. Feldbusch, Roseville, MI (US); Paul R. McEvilly, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 487 days.

(21) Appl. No.: 10/285,212

(22) Filed: Oct. 31, 2002

(65) Prior Publication Data

US 2004/0084964 A1 May 6, 2004

(51) Int. Cl.
*B60L 1/14* (2006.01)

(52) U.S. Cl. ..................................................... 307/10.8

(58) Field of Classification Search ................ 307/10.8
See application file for complete search history.

(56) References Cited

U.S. PATENT DOCUMENTS 2,754,452 A * 7/1956 Onksen ....................... 315/83
5,414,335 A * 5/1995 Sato ........................... 318/466
6,405,164 B1 * 6/2002 Pinai .......................... 704/225
6,837,845 B2 * 1/2005 Falk ............................ 600/22

FOREIGN PATENT DOCUMENTS

| | | |
|---|---|---|
| EP | 0 819 576 | 7/1997 |
| GB | 1 082 054 | 9/1965 |
| GB | 1 409 430 | 12/1972 |

* cited by examiner

*Primary Examiner*—Chau N. Nguyen
*Assistant Examiner*—Dru Parries
(74) *Attorney, Agent, or Firm*—Brooks Kushman P.C.

(57) ABSTRACT

A vehicle switching system includes a controller, a headlamp switch, and a series resistor arrangement. The controller has an input connected to a voltage divider. The switch has a contact movable between positions with each position being associated with a respective headlamp function. The switch is connected to the input of the controller. A top end of each resistor has a connection point associated with a respective switch position. A bottom end of the resistor at the bottom of the series is connected to an electrical ground. Upon the switch contact contacting a connection point a circuit including the resistors between the ground and the connection point is formed such that a signal having a voltage is input to the controller. The voltage of the signal is dependent upon the resistance of the resistors forming the circuit. The controller enables the headlamp function corresponding to the voltage of the signal.

4 Claims, 9 Drawing Sheets

114
103
111
16
112
10
120
118
116
102
122
104

CIRCUIT ARCHITECTURE FOR VEHICLE HEADLAMP SWITCH

BACKGROUND OF THE INVENTION

1. Field of the Invention

The present invention relates to the circuit architecture of vehicle headlamp switches and methods of assembling such switches.

2. Background Art

A typical vehicle headlamp switch enables an operator to switch between different headlamp functions such as "Auto", "Off", "Park", and "Headlamp". Such a headlamp switch includes a switch cell which is rotatably movable by a rotary knob or the like between different switch positions. In each switch position, the switch cell electrically connects certain connection points of an electrical circuit contained in the headlamp switch to form a corresponding closed circuit.

In operation, the operator rotates the rotary knob to rotate the switch cell to a switch position corresponding with the desired headlamp function. For instance, if there are four headlamp functions then the headlamp switch has four different switch positions. Each switch position is associated with a respective headlamp function. Moving the switch cell to a switch position associated with a respective headlamp function causes the electrical circuit contained in the headlamp switch to generate an appropriate electrical signal. A controller such as a microprocessor or the like receives the generated signal from the circuit and then enables the respective headlamp function.

The circuit is configured to generate different signals for each switch position. The signals are differentiated from one another as a function of an electrical characteristic. For example, such circuits typically use a ladder arrangement having a resistor associated with each switch position. The resistors are connected at one end in parallel and each have different resistance values. The circuit is configured such that one of the resistors is contacted at its other end to form a closed circuit when the switch cell is moved to the corresponding switch position. In response, the closed circuit generates a signal having a voltage dependent upon the resistance value of the resistor forming the closed circuit. Based on the voltage of the signal, the controller enables the respective headlamp function. As each resistor has a different resistance value, the voltages of the signals associated with the respective switch positions are different from one another.

Typically, the controller is a digital controller which converts the voltage of the signals into corresponding bit values. For instance, the voltages of the signals may range from 0 to 5 volts and the controller may be an eight bit controller having 255 bit values. As such, the controller converts the voltage of a signal to a corresponding bit value with 0 volts being converted to 0 bits and 5 volts being converted to 255 bits. As is known in the art, the controller converts voltages between 0 and 5 volts as a ratio of the voltage multiplied by the maximum bit value (255) divided by the maximum possible voltage (5 volts). As such, it is desirable that the voltages of the signals corresponding to the different switch positions be separated from one another sufficiently. With voltages in different ranges, the corresponding bit values are placed in different ranges. Such differentiated voltages are obtained by using resistors having sufficiently different resistance values.

However, several disadvantages are associated with a parallel resistor arrangement in a headlamp switch. These disadvantages include the relative lack of seamless continuity when switching from one switch position to another switch position. The parallel resistor arrangement in a headlamp switch has associated issues of "lost continuity" between switching positions due to the required contact gaps. The lost continuity is a result of the required "break before make" contact made by the switch cell with the certain connections when switching between different switch positions. The break before make contact results in undesired electrical noise generated by the circuit when the switch cell is switched between the different switch positions.

SUMMARY OF THE INVENTION

Accordingly, it is an object of the present invention to provide a vehicle headlamp switch having a circuit architecture which includes a series resistor arrangement.

It is a further object of the present invention to provide a method for assembling at least two different switch assemblies for a vehicle.

In carrying out the above objects and other objects, the present invention provides a switching system for a vehicle. The system includes an electrical ground and a controller having an input connected to a voltage divider. The system further includes a headlamp switch having a contact movable between switch positions with each switch position being associated with a respective vehicle headlamp function. The headlamp switch is connected to the input of the controller.

The system further includes a series resistor arrangement having a plurality of resistors connected together in series. A top end of each resistor has a connection point associated with a respective one of the switch positions. A bottom end of the resistor at the bottom of the series is connected to the electrical ground. The resistors have increasing resistance values from one end of the series to the other end of the series.

Upon the contact of the headlamp switch contacting a connection point of the series resistor arrangement a closed circuit including the resistors of the series resistor arrangement between the electrical ground and the connection point is formed such that a signal having a voltage is input to the controller from the headlamp switch. The voltage of the signal is dependent upon the equivalent resistance of the resistors forming the closed circuit. The controller enables the vehicle headlamp function corresponding to the voltage of the signal.

Further, in carrying out the above objects and other objects, the present invention provides a method for assembling at least two different switch assemblies for a vehicle. The method includes providing a pair of identical rotary knobs, rotary shaft assemblies, and switch cells and providing first and second circuit boards.

The method further includes providing a first faceplate having a receptacle for receiving one of the rotary knobs and rotary shaft assemblies and further having switch detents which define a first set of switch positions. A second faceplate having a receptacle for receiving the other one of the rotary knobs and rotary shaft assemblies and further having switch detents which define a second set of switch positions is then provided. The switch positions of the second faceplate are located at respective angular positions which are different than angular positions of the switch positions of the first faceplate.

The method also includes assembling one of the switch cells on the first circuit board and orienting the angular position of the switch cell on the first circuit board to account for the angular positions of the switch positions of the first faceplate. The other one of the switch cells is then assembled on the second circuit board and the angular position of the switch cell on the second circuit board is oriented to account for the angular positions of the switch positions of the second faceplate. The angular position of the switch cell on the second circuit board is different than the angular position of the switch cell on the first circuit board.

Finally, the method includes assembling the first assembled circuit board with the first faceplate such that the rotary knob and the rotary shaft assembly are operable to rotate the switch cell between the different switch positions of the first faceplate. The second assembled circuit board is then assembled with the second faceplate such that the rotary knob and the rotary shaft assembly are operable to rotate the switch cell between the different switch positions of the second faceplate.

DETAILED DESCRIPTION OF THE PREFERRED EMBODIMENT(S)

Figure 1:
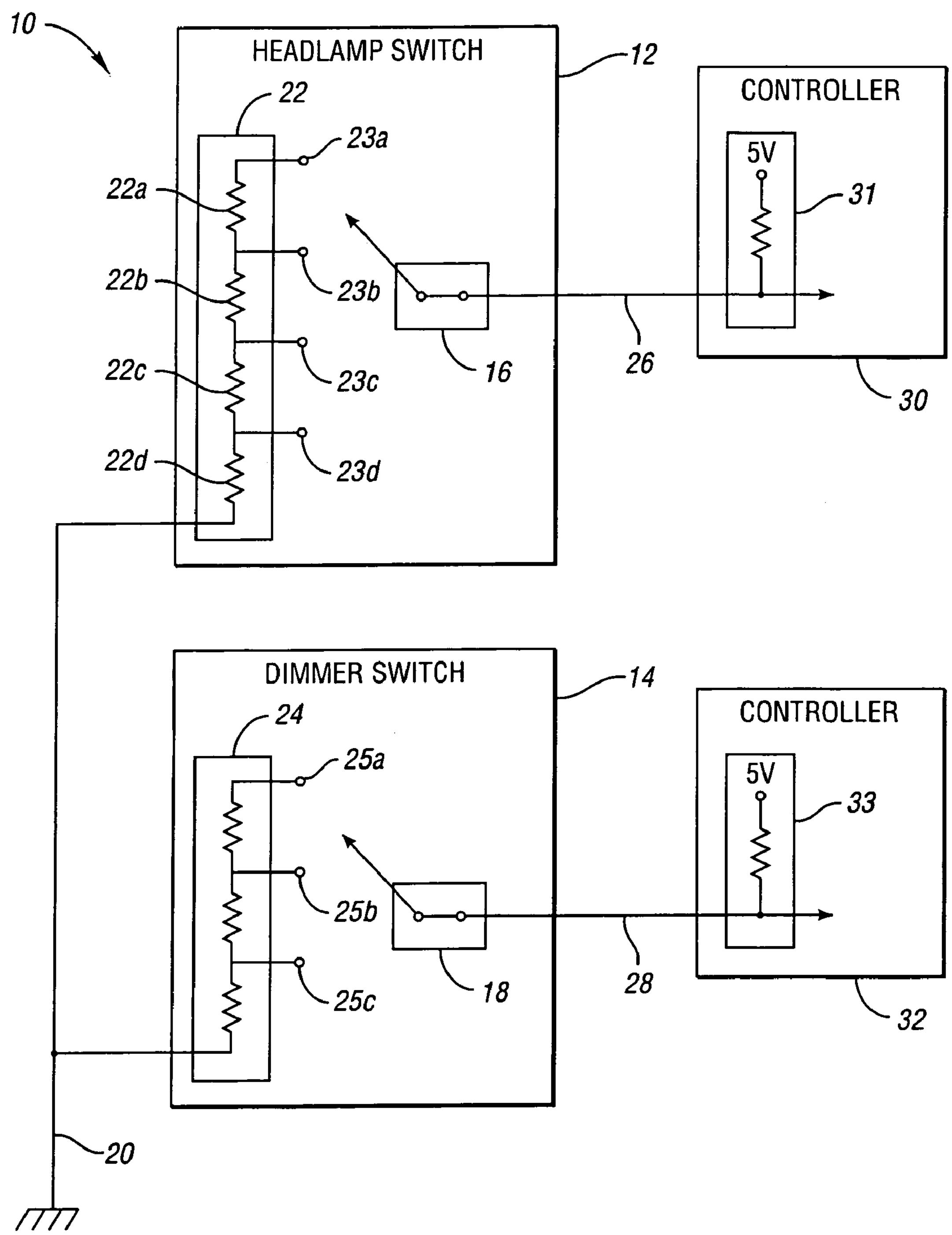
FIG. 1 illustrates a block diagram of a vehicle switch in accordance with the present invention.

Referring now to FIG. 1, a vehicle switch 10 in accordance with the present invention is shown. Switch 10 includes a headlamp switch 12 and an interior light dimmer switch 14. Headlamp and dimmer switches 12 and 14 include respective switch cells 16 and 18. Headlamp and dimmer switches 12 and 14 further include respective series resistor arrangements 22 and 24. Series resistor arrangements 22 and 24 are connected at one end to a dedicated clean electrical ground 20. Series resistor arrangement 22 has a plurality of connection inputs 23*a*, 23*b*, 23*c*, and 23*d*. Each input 23 corresponds to a respective headlamp switch position. Similarly, series arrangement 24 has a plurality of connection inputs 25*a*, 25*b*, and 25*c*. Each input 25 corresponds to a respective dimmer switch position.

Switch cells 16 and 18 have respective outputs 26 and 28 connected to respective headlamp and dimmer controllers 30 and 32. Controllers 30 and 32 are digital controllers having micro-processors. Controllers 30 and 32 include respective voltage dividers 31 and 33 connected to the respective outputs 26 and 28. Voltage dividers 31 and 33 are connected at one end to a 5 volt power supply and include a pull-up resistor to enable the voltage dividing function.

Each input 23 of headlamp switch 12 is associated with a respective headlamp function. For example, input 23*a* is associated with an "auto" headlamp function; input 23*b* is associated with an "off" headlamp function; input 23*c* is associated with a "park" headlamp function; and input 23*d* is associated with a "headlamp" headlamp function. Similarly, each input 25 of dimmer switch 14 is associated with a respective dimmer function. For instance, input 25*a* is associated with a "dome defeat" dimmer function; input 25*b* is associated with a "funeral" dimmer function; and input 25*c* is associated with a "dome on" dimmer function.

In operation, when switch cell 16 contacts an input 23 a closed circuit is formed from electrical ground 20 to voltage divider 31 via series resistor arrangement 22. As a result, headlamp switch 12 generates a signal at output 26. The signal is input to controller 30. The signal corresponds to the enabled headlamp switch position. As a result of series resistor arrangement 22 and voltage divider 31, the signal has a voltage dependent upon which input 23 switch cell 16 contacts. That is, the voltage of the signal is dependent upon which resistors of series resistor arrangement 22 form the closed circuit. For example, if switch cell 16 contacts input 23*a* then each of resistors 22*a*, 22*b*, 22*c*, and 22*d* form part of the closed circuit. Similarly, if switch cell 16 contacts input 23*c* then only resistors 22*c* and 22*d* form part of the closed circuit and if switch cell 16 contacts input 23*d* then only resistor 22*d* forms the closed circuit.

As voltage divider 31 is connected at one end to 5 volts and series resistor arrangement 22 is connected to electrical ground 20, the voltage of the signal at output 26 will fall within the range of 0 to 5 volts. Controller 30 converts the voltage of the signal into a corresponding bit value. Controller 30 is preferably an eight bit controller. As such, the corresponding bit value of the voltage of the signal will fall within the range of 0 to 255 bits. Controller 30 then enables a headlamp function corresponding to the bit value of the signal. Similarly, dimmer switch 14 generates a signal at output 28 for controller 32 when its switch cell 18 contacts an input 25 of series resistor arrangement 24. In response, controller 32 enables a dimmer function corresponding to the voltage of the signal at output 28.

Resistors 22*a*, 22*b*, 22*c*, and 22*d* of series resistor arrangement 22 and voltage divider 31 are configured such that the voltages of the output signals have corresponding bit values which fall within different bit value ranges. Each bit value range is associated with a respective headlamp function and the bit value ranges increase as more resistors of series resistor arrangement 22 form the closed circuit. For instance, a signal having a voltage corresponding to a bit value falling within the range of 195 to 215 bits corresponds to the auto headlamp function (which occurs when input 23*a* is contacted and resistors 22*a*, 22*b*, 22*c*, and 22*d* form part of the closed circuit); a signal having a voltage corresponding to a bit value falling within the range of 160 to 180 bits corresponds to the off headlamp function (which occurs when input 23*b* is contacted and resistors 22*b*, 22*c*, and 22*d* form part of the closed circuit); a signal having a voltage corresponding to a bit value falling within the range of 120 to 140 bits corresponds to the park headlamp function (which occurs when input 23*c* is contacted and resistors 22*c* and 22*d* form part of the closed circuit); and a signal having a voltage corresponding to a bit value falling within the range of 90 to 110 bits corresponds to the lamp headlamp function (which occurs when input 23*d* is contacted and resistor 22*d* forms part of the closed circuit).

The bit value ranges are independent from one another. This is to enable controller 30 to distinguish the signal in order to determine which headlamp function is to be enabled. If two bit value ranges overlapped, then controller 30 would be confused as to which headlamp function is to be enabled upon receiving a signal having a bit value falling within the two overlapping bit value ranges. As such, the bit value ranges should be sufficiently spaced apart from one another by a bit level gap as indicated above to prevent any possible overlap. For instance, in the example above, the bit value range of 195 to 215 bits is separated by a bit level gap of 15 bits with the bit value range of 160 to 180 bits. Specifically, the 195 bit value is 15 bits away from the 180 bit value.

Further, the lowest bit value of the lowest bit value range (for instance, in the example above, the 90 bit value of the 90 to 110 bit value range) should be sufficiently spaced from the 0 bit value (i.e., 0 volts) in order to increase as much as possible the immunity of headlamp switch 12 and controller 30 to an elevated accidental ground condition. Similarly, the highest bit value of the highest bit value range (i.e., the 215 bit value of the 195 to 215 bit value range) should be sufficiently spaced from the 255 bit value (i.e., 5 volts) in order to increase as much as possible the ability of headlamp switch 12 and controller 30 to handle an accidental battery condition.

Accordingly, it is desirable that the bit value ranges be as large as possible, be spaced apart from one another as far as possible, and be positioned at appropriate locations in order to avoid the accidental battery and elevated ground conditions. For these requirements to be met, the 255 bit range provided by controller 30 should be used efficiently. This is done by employing a proper design for the resistance values of the resistors of series resistor arrangement 22.

Accordingly, the resistance values of the resistors of series resistor arrangement 22 have to be chosen in order to ensure that the signal has a proper voltage corresponding to the bit value ranges associated with each headlamp function. As such, the resistance values of the resistors need to be chosen to accommodate for the tolerance of the resistance values of the resistors. Typically, resistors have a resistance value tolerance of 1%, 5%, 10%, etc. For instance, a 100 ohm resistor having a tolerance of 5% would actually a resistance value between 95 and 105 ohms. Accordingly, as an example, the corresponding bit value of the voltage of a signal may be off 5%. As such, the corresponding bit value range must be large enough to handle the possible deviance of the bit value of the voltage of the signal.

The cost of a resistor is a function of its tolerance with resistors having 1% tolerance being more expensive than resistors having a 5% tolerance. As such, in series resistor arrangement 22 it is more desirable to use resistors having a 5% tolerance than resistors having a 1% tolerance. Of course, the proper resistance values which provide signals having bit values corresponding to the associated bit value ranges need to be determined in order to accommodate the increased tolerance.

Dimmer switch 14 and controller 32 are configured similarly such that different bit value ranges of the voltage of the signal generated at output 28 are associated with different dimmer functions. Likewise, the resistance values of the resistors of series resistor arrangement 24 have to be chosen in order to ensure that the signal has a proper voltage corresponding to the bit value ranges associated with each dimmer function.

Figure 2:
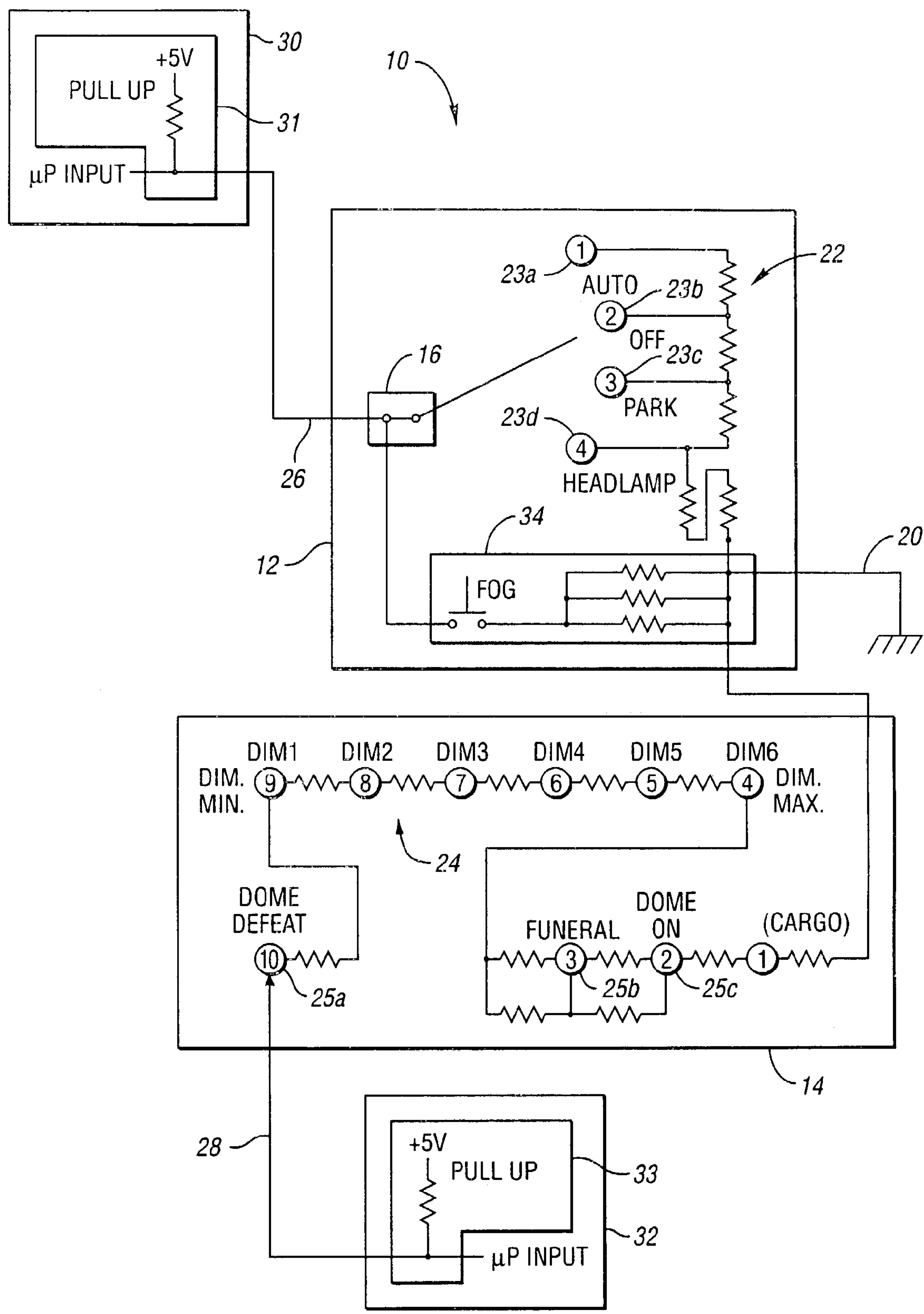
FIG. 2 illustrates the circuit architecture of the vehicle switch shown in FIG. 1 in accordance with a preferred embodiment.

Referring now to FIG. 2, the circuit architecture of vehicle switch 10 in accordance with a preferred embodiment is shown. As shown in FIG. 2, the resistors of series resistor arrangement 22 of headlamp switch 12 have associated preferred resistance and power dissipation values. The resistance values of the resistors between inputs 23 decrease from input 23*a* to input 23*d*. As such, the voltages of the signals generated at output 26 when switch cell 16 contacts an input 23 decreases from input 23*a* to input 23*d*.

An advantage of using series resistor arrangement 22 is that the contact of switch cell 16 with inputs 23 can be done using a "make before break" contact. Such a make before break contact provides a seamless continuity when switching from one switch position to another. The make before break contact is possible because the resistors are in series and, as a result, the corresponding bit level ranges are in order and one bit level range is entered (i.e., "make") before the other bit level range is exited (i.e., "break").

Headlamp switch 12 further includes a fog lamp switch configuration 34 which is connected at one end to electrical ground 20. Fog lamp switch configuration 34 can be switched to form a closed circuit between electrical ground 20 and controller 30. In response to fog lamp switch configuration 34 being closed the voltage of the signal generated at output 26 changes accordingly. As such, controller 30 enables fog light functions in addition to any enabled vehicle headlamp function.

As shown in FIG. 2, series resistor arrangement 24 of dimmer switch 14 includes additional resistors and inputs 25. Each of the additional inputs corresponds to respective additional dimmer switch positions such as "Dim1", "Dim2", etc. The resistors of series resistor arrangement 24 of dimmer switch 14 also have associated preferred resistance and power dissipation values. Like series resistor arrangement 22, the resistance values between inputs 25 decrease from input 25*a* to input 25*c*. As such, the voltages of the signals generated at output 28 when switch cell 18 contacts an input 25 decreases from input 25*a* to input 25*c*.

Figure 3:
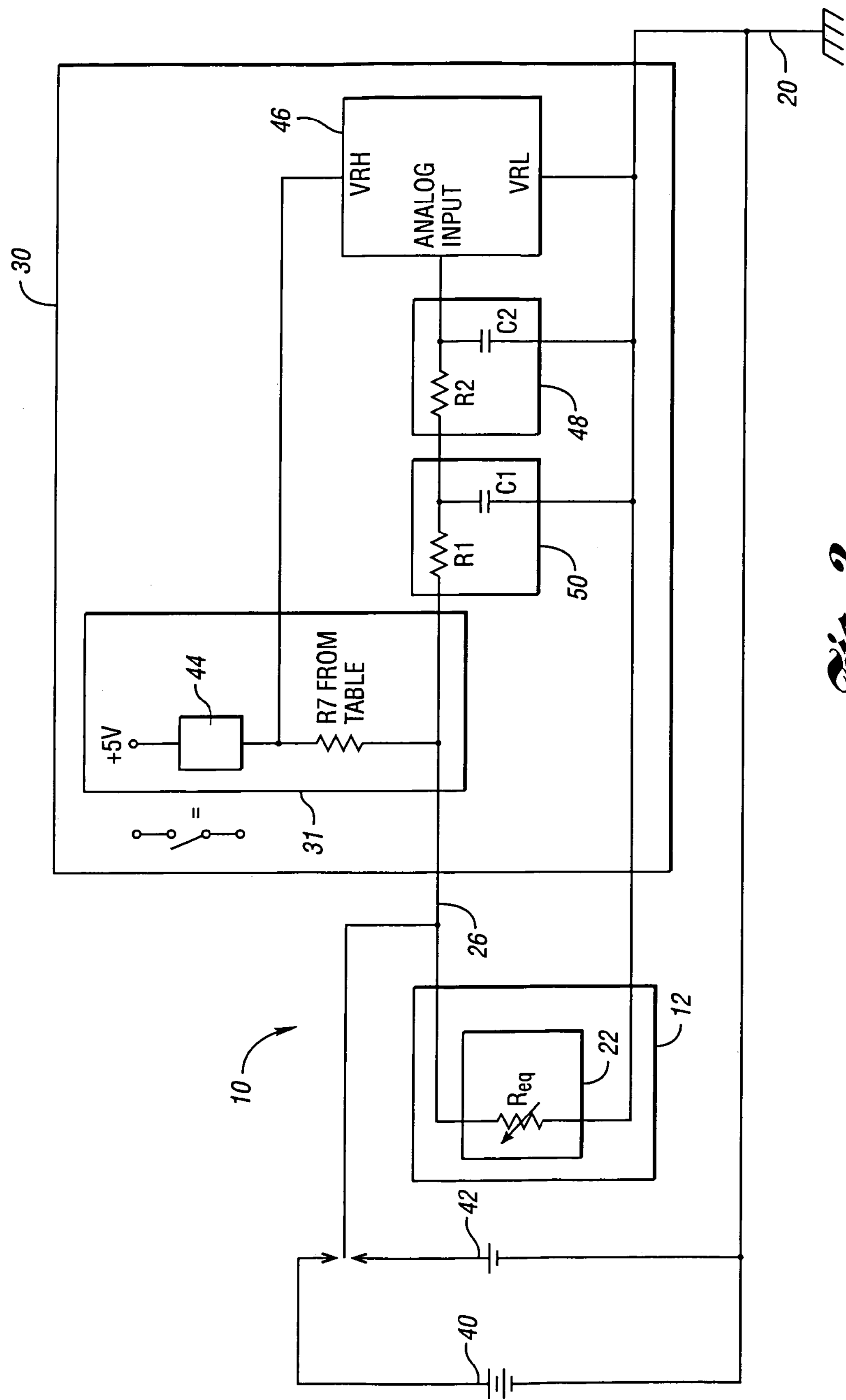
FIG. 3 illustrates a general circuit schematic of the headlamp switch and headlamp controller of the vehicle switch shown in FIG. 2.

Referring now to FIG. 3, a general circuit schematic of headlamp switch 12 and headlamp controller 30 of vehicle switch 10 is shown. As will be described in greater detail, the resistance values of the resistors of series resistor arrangement 22 of headlamp switch 12 are chosen to accommodate for accidental battery and elevated accidental ground conditions in addition to providing proper separation of the voltages and the corresponding bit values of the output signals generated for different headlamp switch positions. Similarly, the resistance values of series resistor arrangement 24 of dimmer switch 14 are chosen to accommodate for these factors. FIG. 3 illustrates the general circuit schematic for headlamp switch 12 and headlamp controller 30 and it is to be appreciated that the general circuit schematic and the related discussion also applies to dimmer switch 14 and dimmer controller 32.

As shown in FIG. 3, output 26 of headlamp switch 12 is susceptible to an accidental battery condition caused when a voltage from a battery 40 powering switch 10 is inadvertently applied between switch cell 16 and controller 30. Similarly, output 26 is susceptible to an elevated accidental ground condition caused when an electrical ground 42 is inadvertently applied between switch cell 16 and controller 30. An accidental battery condition causes output 26 to generate a signal having a high voltage. The voltage of such a signal is typically greater than the 5 volts applied to voltage divider 31 because battery 40 typically has a higher voltage. As such, the bit value of the signal input to controller 30 will be the maximum 255 bit value. An elevated accidental ground condition causes output 26 to generate a signal having no voltage (i.e. short circuit). As such, the bit value of the signal input to controller 30 will be the minimum 0 bit value.

Further, as shown in FIG. 3, voltage divider 31 of controller 30 is connected to the 5 volt power supply via an electronic switch/regulator 44. Electronic switch/regulator 44 is configured to switch on the 5 volt power supply at 1 millisecond pulses. Controller 30 further includes a microprocessor 46 connected by two respective RC circuits 48 and 50. RC circuits 48 and 50 are configured to enable microprocessor 46 to poll the signal at output 26 after roughly 500 microseconds in order to allow the signal to stabilize.

The resistance values of the resistors of series resistor arrangement 22 are chosen to accommodate for the worst conditions that could occur in the vehicle environment. Such factors are related to bias current, leakage current, capacitance in the micro-processor 46, and the like. Further factors include a contact resistance such as 5 ohms between switch cell 16 and inputs 23 of series resistor arrangement 22. The resistance values of the resistors of series resistor arrangement 22 are also chosen as a function of the resistance value of the resistor of voltage divider 31 of controller 30. Such controllers are typically off the shelf parts which have some sort of standard resistance value for the resistor of voltage divider 31. For instance, the resistance value of the resistor of voltage divider 31 may by 313 ohms, 1 k-ohms, or 5 k-ohms.

Based on these factors and the resistance value of the resistor of voltage divider 31, the process of choosing the resistance values of the resistors of series resistor arrangement 22 involves a trial and error process in which resistance values for the resistors in the series arrangement are chosen in sequential order. Thus, the resistance value of the first resistor in the series arrangement (i.e., resistor 22*d* of series resistor arrangement 22) is initially chosen. Based on the chosen resistance value for first resistor 22*d*, the first bit value of the voltage of the signal output when switch cell 16 contacts input 23*d* and forms a closed circuit is determined. This closed circuit includes only first resistor 22*d*. Then the first bit value range is determined based on the tolerance of first resistor 22*d* and the other worst condition factors.

Whether the first bit value range falls within a generally appropriate location within the 255 bit value range provided by controller 30 can be readily determined. For instance, if the first bit value range is 5 to 25 bits then it can be readily determined that this bit value range will not provide a sufficient bit level gap with potential accidental elevated ground conditions. Similarly, if the first bit level range is 200 to 220 bits then it can be readily determined that succeeding bit level ranges will not have any room within the 255 bit value range provided by controller 30. As such, a different resistance value of first resistor 22*d* is then chosen.

Once it is determined that a chosen resistance value for first resistor 22*d* provides a signal having a voltage corresponding to a generally appropriate bit value range such as 95 to 115 bits, the resistance value for the next succeeding resistor in the series arrangement (i.e., resistor 22*c* of series resistor arrangement 22) is chosen. Based on the chosen resistance value for second resistor 22*c*, the second bit value of the voltage of the signal output when switch cell 16 contacts input 23*c* and forms a closed circuit is determined. This closed circuit includes only first and second resistors 22*d* and 22*c* which combine in series to form an equivalent resistor (Req). Then the second bit value range is determined based on the tolerance of the first and second resistors 22*d* and 22*c* (i.e., Req) and the other worst condition factors.

Using the same methodology for determining whether the first bit value range falls within a generally appropriate location within the 255 bit value range provided by controller 30, it can be readily determined whether the second bit value range falls within a generally appropriate location. Initially, it is noted that the second bit value range will be a higher bit value range than first bit value range. This is because the second bit value range is associated with a higher Req (i.e., first and second resistors 22*d* and 22*c*) than the Req (i.e., first resistor 22*d*) associated with the first bit value range. Another factor for determining whether the second bit value range falls within an appropriate location is to determine whether the second bit value range is sufficiently spaced apart from the first bit value range. For instance, if the second bit value range is 120 to 140 bits and the first bit value range is 95 to 115 bits, then it can be determined that the spacing is not sufficient as only 5 bits separate the two bit level ranges. In this case, another resistance value for second resistor 22*c* is chosen.

Of course, the process may revert back to selecting a different resistance value for first resistor 22*d* upon determining that a different equivalent resistance value is needed once a resistance value for second resistor 22*c* is chosen. The process is then repeated for the third resistor 22*b* and then the fourth resistor 22*a*. That is, resistance values are chosen for these resistors to provide for appropriate bit level ranges. Such appropriate bit level ranges will generally have a roughly equally spaced separation (i.e., bit level gap) between neighboring bit level ranges, be spaced across the 255 bit level range provided by controller 30 in order to efficiently use the usable bit level range provided by the controller, and be sufficiently spaced from bits values associated with accidental elevated ground and battery conditions. Upon determining at any point in the process that selected resistance values for the resistors do not provide bit level ranges which satisfy these conditions, then the resistance values can be chosen again prior to determining the resistance value for the next succeeding resistor.

Figure 4:
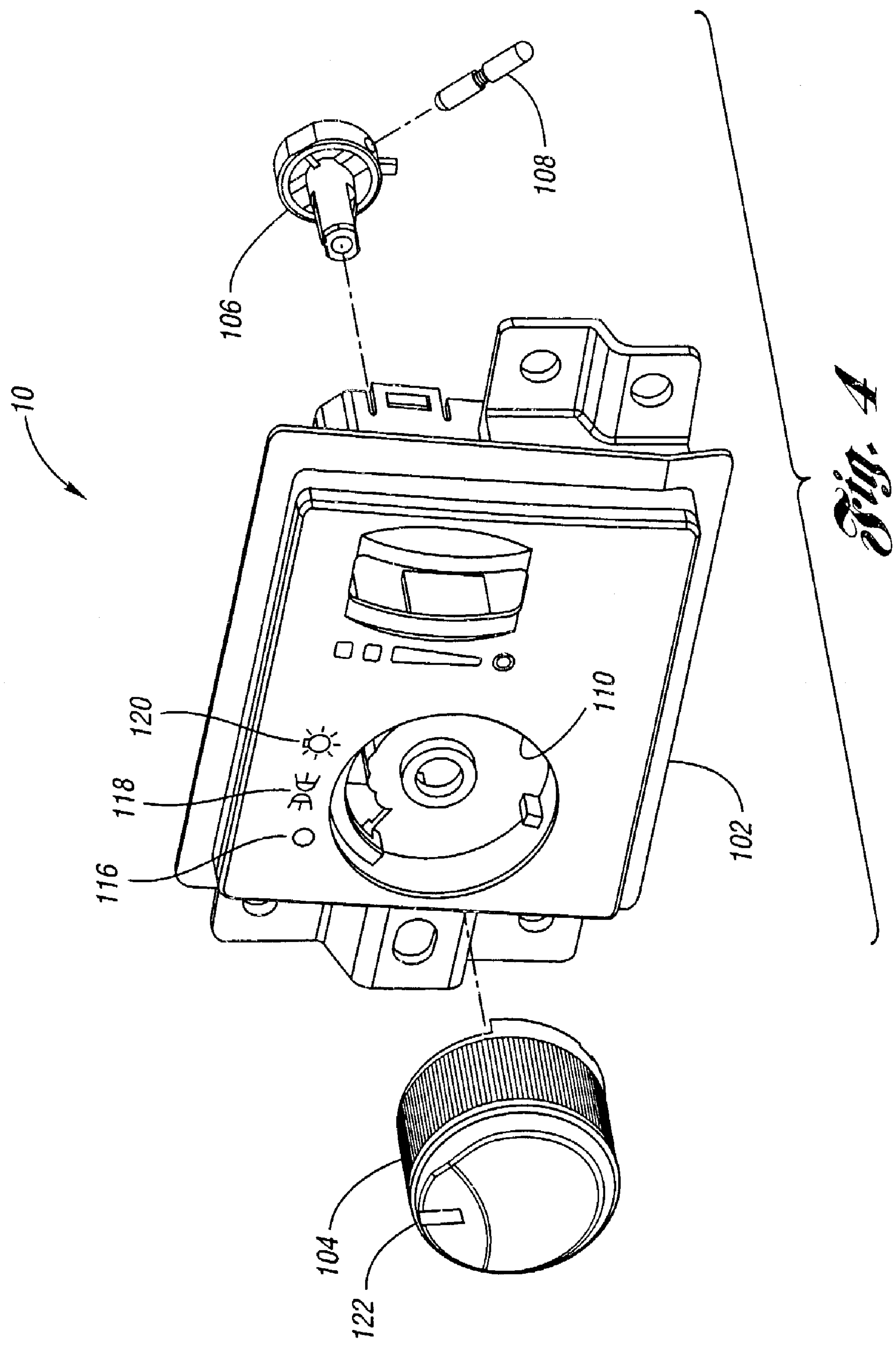
FIG. 4 illustrates a partially exploded view of the fully assembled vehicle switch in accordance with the present invention.
Figure 5:
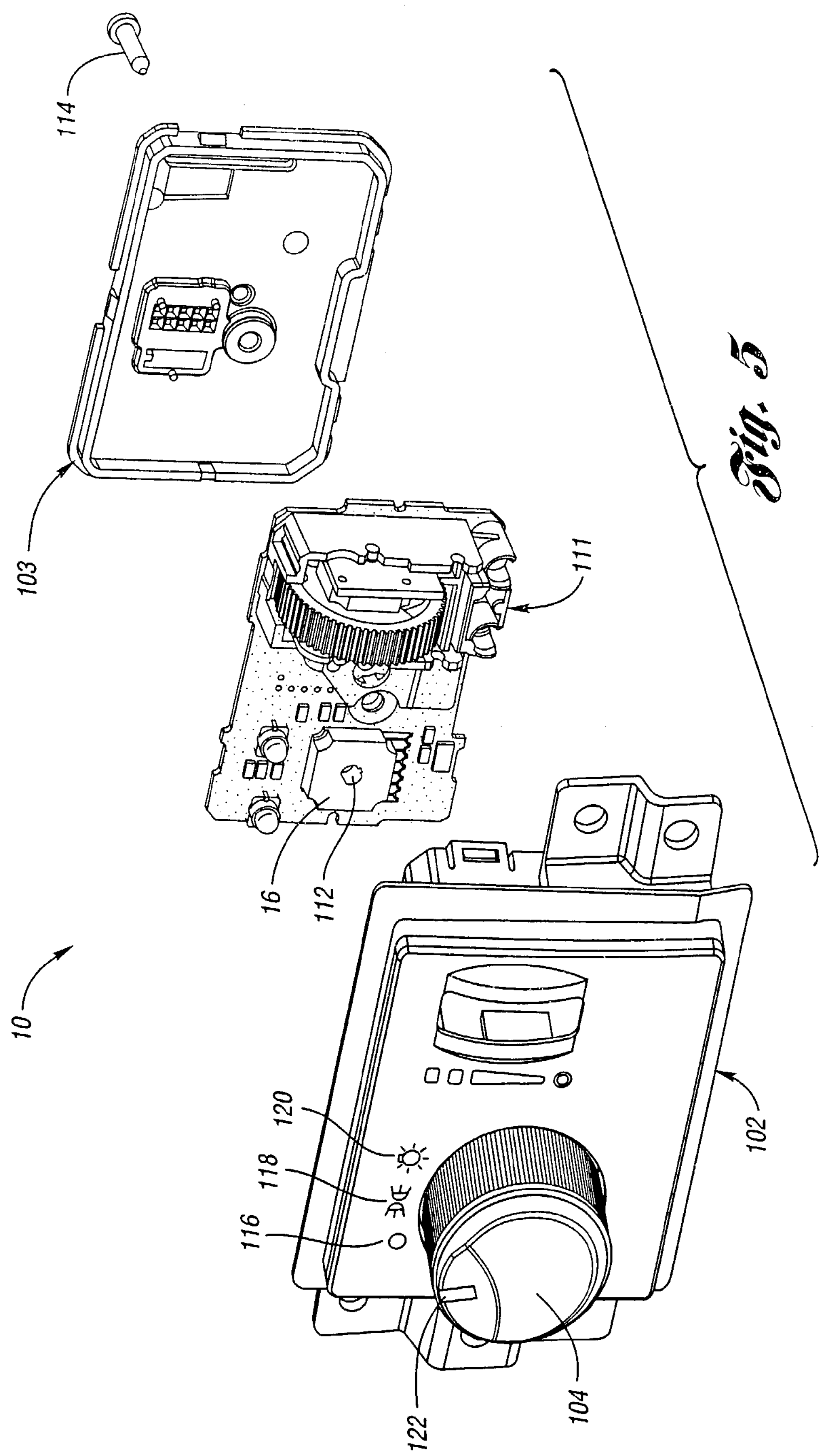
FIG. 5 illustrates a second partially exploded view of the fully assembled vehicle switch shown in FIG. 4.

Referring now to FIGS. 4 and 5, partially exploded views of the fully assembled vehicle switch 10 are shown. Switch 10 includes a faceplate 102, a backplate 103, a rotary knob 104, and a rotary shaft 106 having an associated rotary plunger assembly 108. Rotary knob 104 fits within a receptacle 110 provided on a front side of faceplate 102. Rotary shaft 106 fits within a corresponding receptacle provided on the back side of faceplate 102. Rotary shaft 106 engages with rotary knob 104 to rotate as the rotary knob rotates. Rotary plunger assembly 108 is operable with the switch detents provided in the interior of faceplate 102 to define switch positions. An operator rotates rotary knob 104 to rotate rotary shaft assembly 106 between the different switch positions.

Switch 10 has three different switch positions as indicated by indicia 116, 118, and 120. Each switch position is associated with a respective vehicle headlamp function. Rotary knob 104 has a marker 122 to indicate to the operator the relative rotary position of the rotary knob. As such, the interior of faceplate has switch detents which define the three different switch positions. Rotary knob 104 is able to rotate between the three different switch positions and in each switch position its marker 122 is aligned with the corresponding switch position indicia 116, 118, and 120.

Switch 10 further includes a printed circuit board and frame assembly 111. Circuit board 111 includes switch cell 16. Switch cell 16 has a rotatable opening 112 configured to receive a shaft provided on the non-shown side of rotary shaft assembly 106. As rotary shaft assembly 106 is moved between the different switch positions, opening 112 of switch cell 16 rotates as a result of engagement with the non-shown shaft of the rotary shaft assembly 106. In each switch position, switch cell 16 makes contact with a corresponding input 23 of series resistor arrangement 22. Fastening means 114 fasten backplate 103 to faceplate 102 with circuit board 111 interposed therebetween.

Figure 6:
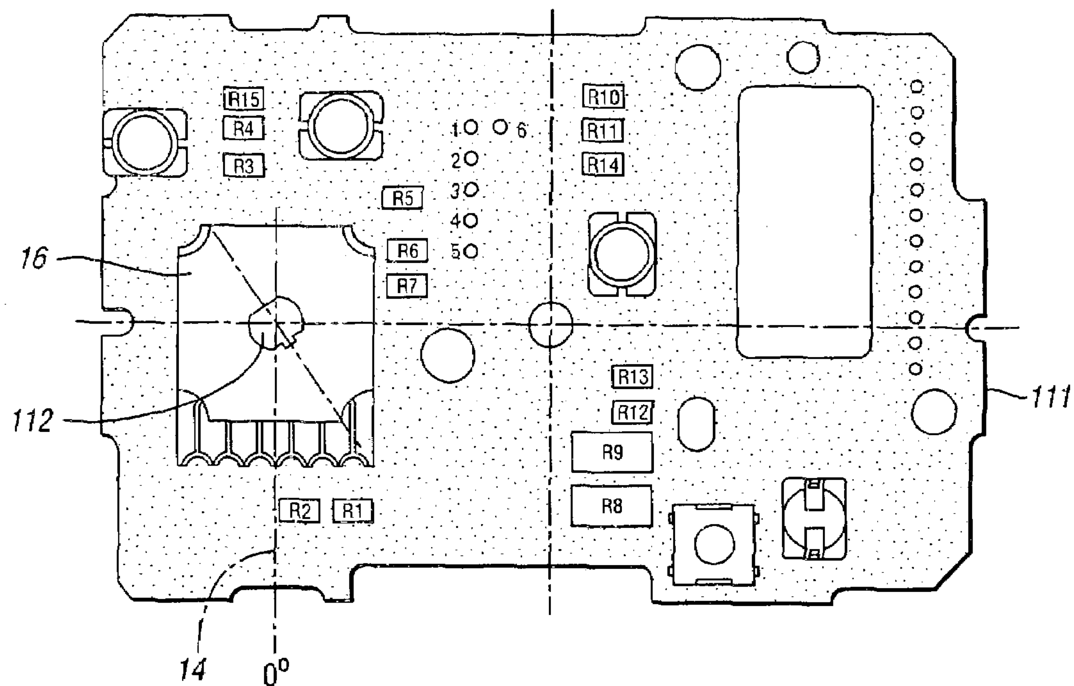
FIG. 6 illustrates a top view of the printed circuit board of the vehicle switch shown in FIG. 4.

Referring now to FIG. 6, a top view of circuit board 111 is shown. As shown, switch cell 16 is oriented at 0° with respect to a perpendicular axis 114 running across printed circuit board 110. The switch detents contained within the interior of faceplate 102 are oriented with respect to the orientation of switch cell 16.

Figure 7:
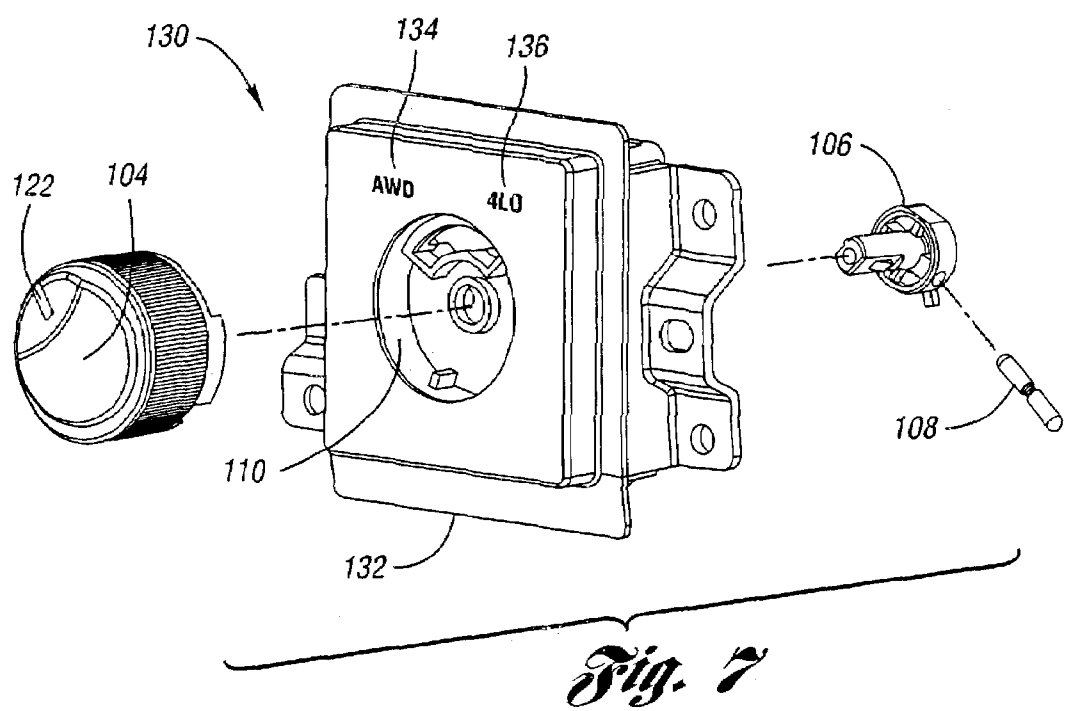
FIG. 7 illustrates a partially exploded view of a fully assembled two-position transfer case switch in accordance with the present invention.
Figure 8:
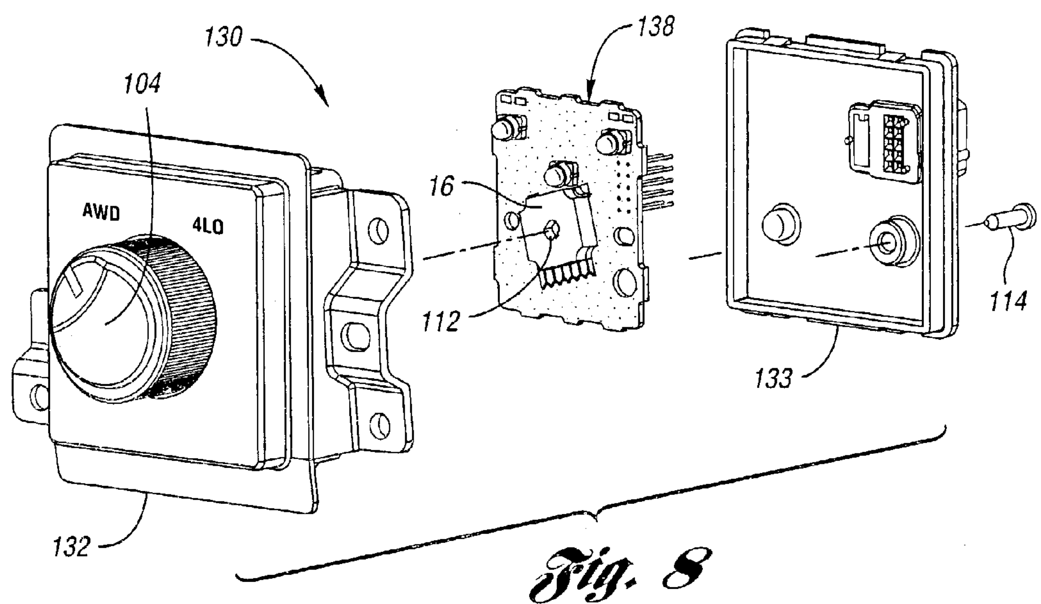
FIG. 8 illustrates a second partially exploded view of the fully assembled two-position transfer case switch shown in FIG. 7.

Referring now to FIGS. 7 and 8, partially exploded views of a fully assembled two-position transfer case switch 130 in accordance with the present invention is shown. Switch 130 includes a two-position faceplate 132 and a backplate 133. In accordance with the present invention, switch 130 includes the same identical rotary knob 104 and rotary shaft 106 with the associated rotary plunger assembly 108. Rotary knob 104 fits within the same identical receptacle 110 provided on a front side of faceplate 132. Rotary shaft 106 fits within a corresponding receptacle provided on the back side of faceplate 132 and engages with rotary knob 104 to rotate as the rotary knob rotates. Rotary plunger assembly 108 is operable with the switch detents provided in the interior of faceplate 132 to define switch positions.

Switch 130 has two different switch positions as indicated by indicia 134 and 136. Each switch position is associated with a respective vehicle transfer case function. Marker 122 of rotary knob 104 indicates to the operator the relative rotary position of the rotary knob. As such, the interior of faceplate 132 has switch detents which define the two different switch positions. Rotary knob 104 is rotatable between the two different switch positions and in each switch position marker 122 is aligned with the corresponding switch position indicia 134 and 136.

Switch 130 further includes a printed circuit board 138 which includes the same identical switch cell 16. As rotary shaft assembly 106 is moved between the two different switch positions, opening 112 of switch cell 16 rotates as a result of engagement with rotary shaft assembly 106. Fastening means 114 fasten backplate 133 to faceplate 102 with circuit board 138 interposed therebetween.

A difference between faceplates 102 and 132 is the difference in the relative location of the switch position indicia. As such, the switch detents contained in the interior of faceplate 132 are located at relatively different angular positions with respect to the location of the switch detents contained in faceplate 102.

Figure 9:
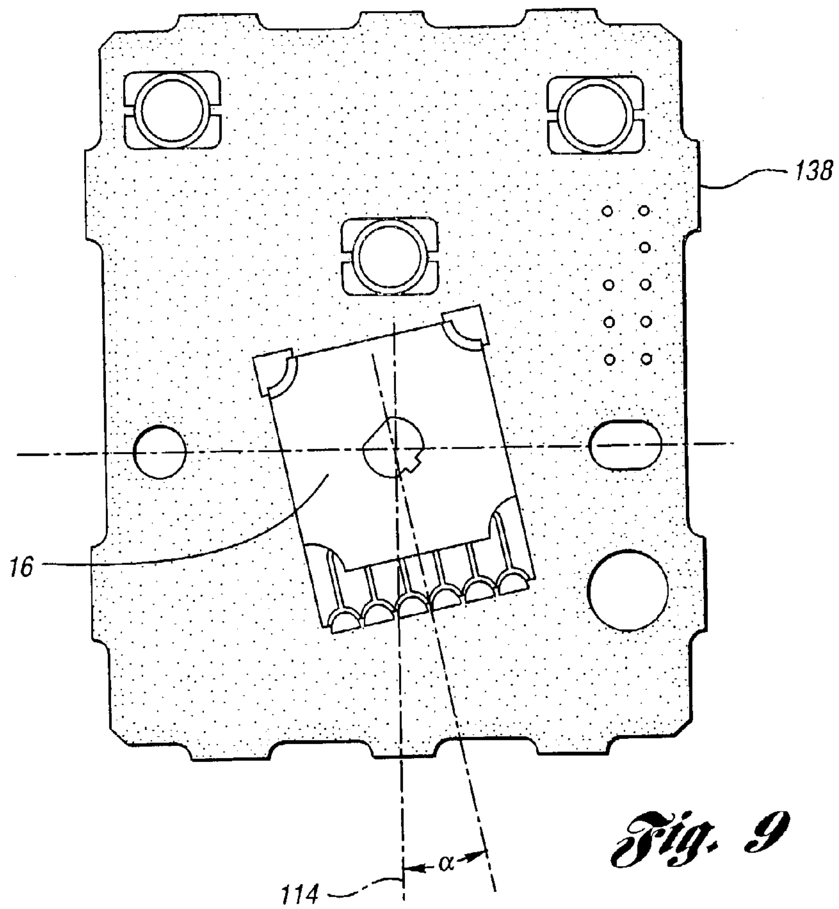
FIG. 9 illustrates a top view of the printed circuit board of the two-position transfer case switch shown in FIG. 7.

Referring now to FIG. 9, a top view of circuit board 138 is shown. As shown, switch cell 16 is oriented roughly 11.25° with respect to perpendicular axis 114. Switch cell 16 is oriented at this angle to account for the location of the switch detents contained in faceplate 132. As these switch detents are located at different angular positions with respect to the switch detents contained in faceplate 102 and as the other components are identically the same (i.e., rotary knob 104, rotary shaft assembly 106, rotary shaft plunger assembly 108, and switch cell 16) the angled orientation of switch cell 16 accounts for the differences in the switch detent positions. As such, by simply orienting switch cell 16 to correspond to the location of the switch positions, many of the same elements may used for assembling switches 10 and 130. In essence, as a result of orientating switch cell 16 appropriately with respect to perpendicular axis 114, the designs of switches 10 and 130 are communized.

Figure 10:
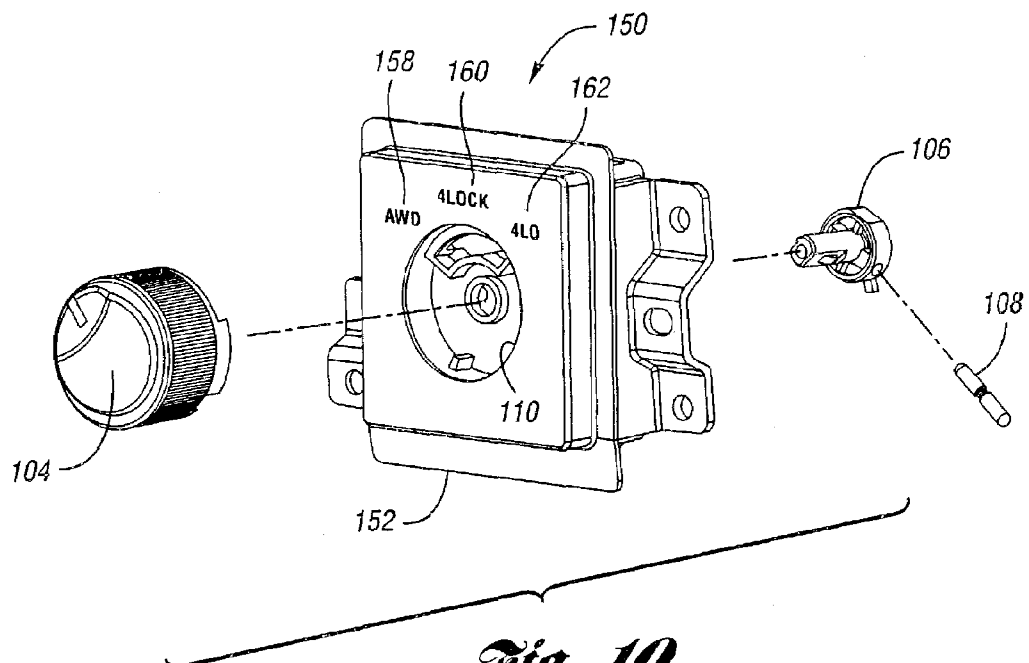
FIG. 10 illustrates a partially exploded view of a fully assembled three-position transfer case switch in accordance with the present invention.
Figure 11:
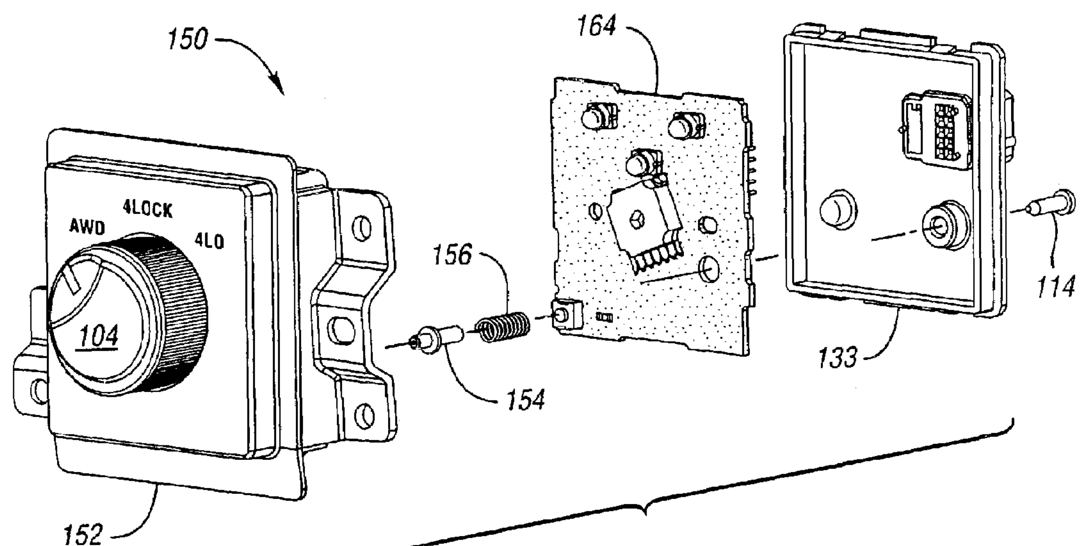
FIG. 11 illustrates a second partially exploded view of the fully assembled three-position transfer case switch shown in FIG. 10.
Figure 12:
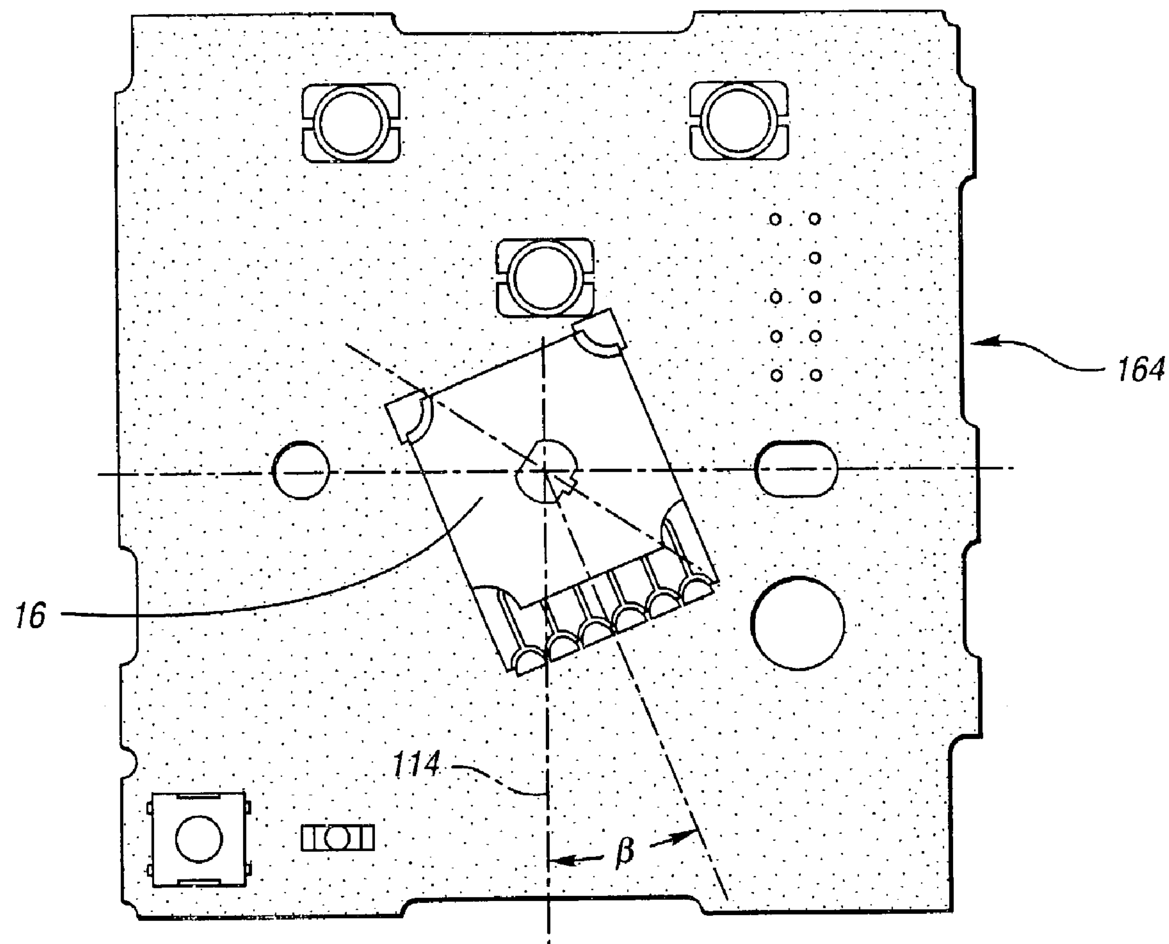
FIG. 12 illustrates a top view of the printed circuit board of the three-position transfer case switch shown in FIG. 10.

With reference to FIGS. 10, 11, and 12, this design communization between switches may be further understood. FIGS. 10 and 11 illustrate partially exploded views of a fully assembled three-position transfer case switch 150 in accordance with the present invention. Switch 150 includes the same elements as switches 10 and 130 with the exception of faceplate 152. Switch 150 further includes an actuator neutral switch 154 and an associated spring actuator 156.

Switch 150 has three different switch positions as indicated by indicia 158, 160, and 162. Each switch position is associated with a respective vehicle transfer case function. As such, the interior of faceplate 152 has switch detents which define the three different switch positions. Switch 150 further includes a printed circuit board 164 which includes the same identical switch cell 16. As rotary shaft assembly 106 is moved between the three different switch positions, opening 112 of switch cell 16 rotates as a result of engagement with the rotary shaft assembly.

Switch position indicia 158, 160, and 162 of faceplate 152 have a different location relative to the location of the switch position indicia of faceplates 102 and 132. As such, the switch detents contained in the interior of faceplate 152 are located at relatively different rotary positions with respect to the location of the switch detents contained in faceplates 102 and 132.

Referring now to FIG. 12, a top view of circuit board 164 is shown. As shown, switch cell 16 is oriented roughly 22.5° with respect to perpendicular axis 114. Switch cell 16 is oriented at this angle to account for the location of the switch detents contained in faceplate 152. As these switch detents are located at different positions with respect to the switch detents contained in faceplates 102 and 132 and as the other components are identically the same this angled orientation of switch cell 16 accounts for the differences in the switch detent positions. Again, by simply orienting switch cell 16 to correspond to the location of the switch positions, many of the same elements may used for assembling switches 10, 130, and 150.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the present invention.

What is claimed is:

1. A switching system for a vehicle, the system comprising:

a controller having an input connected to a voltage divider having a supply voltage, the controller having a regulator configured to switch on the supply voltage at roughly one millisecond pulses, the controller having a microprocessor including a power supply input connected to the regulator to receive the pulsed supply voltage, an electrical ground input connected to electrical ground, and an analog input, the controller having a pair of RC circuits in series between the input of the controller and the analog input of the microprocessor to enable the microprocessor to poll a signal having a voltage provided to the input of the controller after roughly five-hundred microseconds in order to allow the signal to stabilize;

a headlamp switch having a contact movable between switch positions with each switch position being associated with a respective vehicle headlamp function, the headlamp switch being connected to the input of the controller; and a series resistor arrangement having a plurality of resistors connected together in series, a top end of each resistor having a connection point associated with a respective one of the switch positions, a bottom end of the resistor at the bottom of the series being connected to the electrical ground, the resistors having increasing resistance values from one end of the series to the other end of the series;

wherein upon the contact of the headlamp switch contacting a connection point of the series resistor arrangement a closed circuit including the resistors of the series resistor arrangement between the electrical ground and the connection point and including the voltage divider is formed such that a signal having a voltage is provided to the input of the controller from the headlamp switch and is received by the analog input of the microprocessor via the pair of RC circuits, the voltage of the signal being dependent upon the equivalent resistance of the resistors forming the closed circuit, wherein the microprocessor enables the vehicle headlamp function corresponding to the voltage of the signal;

wherein the resistance values of the resistors are set such that the voltages of the signals which are input to the controller from the headlamp switch upon the contact of the headlamp switch contacting the connection points fall into independent voltage ranges, with each voltage range being respectively associated with one of the vehicle headlamp functions, and such that the lowest voltage in the lowest voltage range is spaced from the electrical ground to accommodate for an accidental elevated ground condition and such that the highest voltage in the highest voltage range is spaced from the supply voltage to accommodate for an accidental battery condition;

wherein the ratio of the resistance values of the resistors is set to account for a predetermined tolerance in the resistance values such that the voltages of the signals which are input to the controller from the headlamp switch upon the contact of the headlamp switch contacting the connection points of the series resistor arrangement fall into the independent voltage ranges.

2. The system of claim 1 wherein:

the resistors have increasing resistance values from the bottom of the series to the top of the series.

3. The system of claim 1 further comprising:

a vehicle interior dimmer switch having a contact movable between switch positions with each switch position being associated with a respective vehicle interior dimmer function, the vehicle interior dimmer switch being connected to the input of the controller; and a dimmer series resistor arrangement having a plurality of dimmer resistors connected together in series, a top end of each dimmer resistor having a connection point associated with a respective one of the dimmer switch positions, a bottom end of the dimmer resistor at the bottom of the dimmer series being connected to the electrical ground, the dimmer resistors having increasing resistance values from one end of the series to the other end of the series;

wherein upon the contact of the dimmer switch contacting a connection point of the dimmer series resistor arrangement a closed circuit including the resistors of the dimmer series resistor arrangement between the electrical ground and the connection point is formed such that a dimmer signal having a voltage is input to the controller from the dimmer switch, the voltage of the signal being dependent upon the equivalent resistance of the dimmer resistors forming the closed circuit, wherein the controller enables the vehicle interior dimmer function corresponding to the voltage of the dimmer signal.

4. The system of claim 1 wherein:

the voltage ranges are spaced roughly evenly across a usable voltage range provided by the controller for receiving signals at the input of the controller.

* * * * *